Sept. 8, 1942. C. LE BLEU 2,295,264
TRAILBUILDER AND BULLDOZER
Filed March 24, 1941

INVENTOR.
Charles Le Bleu

Patented Sept. 8, 1942

2,295,264

UNITED STATES PATENT OFFICE 2,295,264

TRAIL BUILDER AND BULLDOZER

Charles Le Bleu, Los Angeles, Calif.

Application March 24, 1941, Serial No. 384,851

9 Claims. (Cl. 37—144)

This invention relates generally to earth moving machines, the term earth being taken in the broad sense to include dirt, ice, snow, and the like, adapted to be connected to a tractor to be moved across a surface to be treated for scraping up earth therefrom. A machine of this general character is shown in my Patent No. 2,184,688 and upon which this invention is an improvement.

In the above mentioned patent, a device of the character mentioned is provided in which an implement is connected with a tractor for vertical swinging movement about a horizontal axis. Control means are provided between the free end of the implement and the tractor for raising and lowering the same, for supporting said implement parallel to said axis and disposing the weight thereof substantially equally on the track laying units of the tractor in any relative position of said track laying units. In this earlier arrangement, the control cable is almost continually shifting back and forth about the associated pulley wheels in response to relative movement between the track laying units, which relative movement is due to uneven ground over which the tractor is traveling, and results in considerable wear and tear on the cable and associated pulley wheels and their pivotal supports, and therefore the main object of this, my present invention is the provision of means for controlling and supporting the implement so as to maintain the same parallel to said horizontal axis and dispose the weight thereof substantially equally on said track laying units in any position of each of said track laying units relative to the other, said means including a control support frame so constructed and mounted that shifting of the controls in response to relative movement between the track laying units is substantially eliminated.

Still another object of my invention is the provision of a control support structure that may be easily applied to and removed from the tractor.

And still another object of my invention is the provision of a bulldozer so arranged and constructed that the free end of the implement may be swung upwardly until the scraping edge, or blade, of the bulldozer is in a position forwardly of and above the tractor so that the same may be used to push over and bring about the uprooting of trees and the like.

Other objects of my invention reside in the various details of construction and in the combination of parts, members, and features exemplified in the accompanying drawing and described in the specification, and finally pointed out in the annexed claims, it being understood that the invention is not confined to the exact features shown as various changes may be made without departing from the spirit of the invention as defined in the claims.

Figure 1:
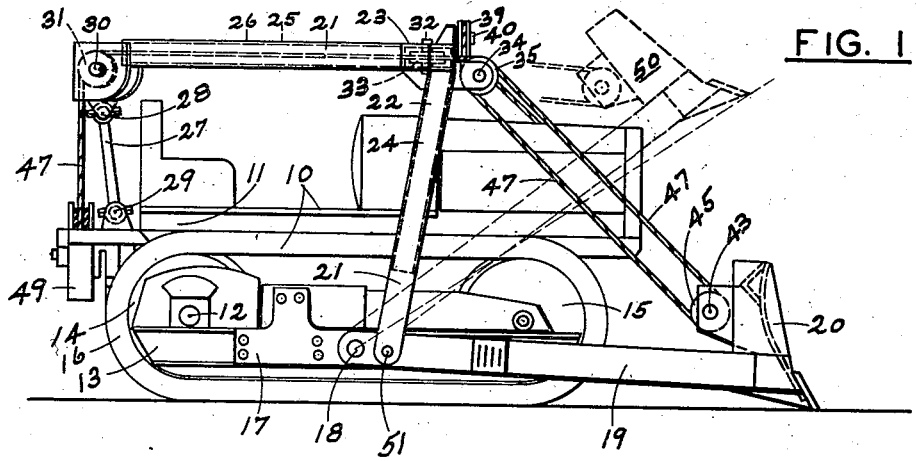
Figure 1 is a side elevation of my invention mounted on a tractor.
Figure 2:
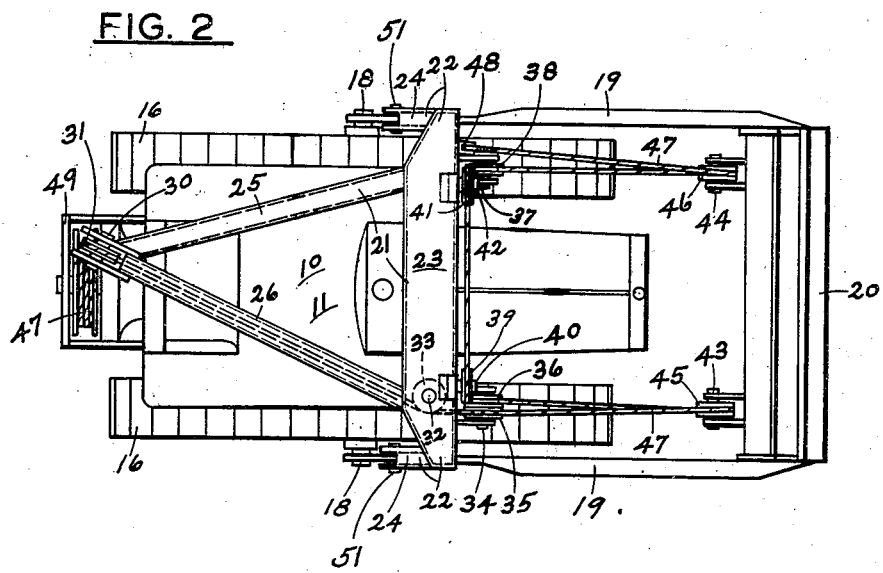
Figure 2 is a top plan view of Figure 1.

Reference will now be made to the accompanying drawing for a more detailed description of my invention.

A tractor 10 includes a body 11 and a pair of track laying units disposed one along each side of the body and journaled thereon, as shown at 12, for independent swinging movement about a common axis, said track laying units including a frame 13 and wheels 14 and 15 about which a flexible track 16 passes.

Applicant's invention is applied to tractor 10 as follows: a bracket 17 is secured to each of the frames 13, as shown, each of said brackets having a horizontal trunnion 18 projecting therefrom and upon each of which is journaled a side beam 19 which extends forwardly therefrom and has supporting association with an earth handling device 20 which extends transversely of the tractor forwardly thereof. Thus an earth handling implement is disposed with the tractor and connected thereto for swinging movement about a horizontal axis. However, it is to be understood that the pivotal connection of the implement to the tractor, as shown at 18, is in fact an articulate connection, the openings in side beams 19 being materially larger than the trunnions 18 which extend therethrough so that said trunnions may rock or tilt, within the openings through beams 19. Thus it is seen that axis 18 may tilt transversely of the tractor as the same moves across an uneven surface without interfering materially with the normal relative swinging movement of the track laying units. This method of providing limited articulate connection is conventional in trailbuilder and bulldozer design because it provides the necessary articulate action at less cost than would be involved in providing ball and socket connections.

A control support frame 21 is disposed with the tractor and the implement and includes an inverted U beam 22 having a horizontal portion 23 which extends transversely of the tractor above the same, and vertical portions 24, one of which depends downwardly at each end of horizontal portion 23, each of said vertical portions 24 being pivotally supported as shown at 51 on an adjacent side beam 19 a. point considerably removed from the pivotal connection of side beams 19 with the tractor so that the horizontal portion 23 of U beam 22 is supported and maintained parallel to the plane of the implement in any position of each of said track laying units about their common axis. The control support frame 21 also includes overhead beams 25 and 26 which are arranged above the tractor, the forward end of each of said beams being connected with U beam 22 at points spaced along the length thereof and from which they extend in a rearwardly direction, said beams 25 and 26 being rigidly connected at their rear ends, and a link 27 provides articulate connection between the rear end of control support frame 21 and the body 11 of the tractor, for maintaining frame 21 in its upright position about pivots 51, said link being articulately connected with frame 21 at 28 and with body 11 at 29. It will be noted that although frame 21 is pivotally connected with beams 19 at 51 said frame 21 is nevertheless supported by wheeled structures 13 since beams 19 are supported by said wheeled frame structures as shown at 18.

Thus, control support frame 21 has articulate three point support, being supported at its forward portion on the implement at opposite sides of the tractor, and at its rear end on the body, 11, of the tractor at a point removed inwardly from the sides thereof.

A horizontal pin 30 is supported on the rear end of beams 25 and 26 and upon which a pulley wheel 13 is journaled.

A horizontal pulley 33 is journaled on a vertical pin 32 carried by frame 21.

Frame 21 is provided with a horizontal pin 34 upon which is journaled pulleys 35 and 36, and with a horizontal pin 37 upon which is journaled pulley 38.

A pulley wheel 39 is journaled upon a forwardly projecting trunnion 40 carried by frame 21.

A pulley wheel 41 is journaled on a forwardly projecting trunnion 42 carried by frame 21.

The earth working implement is provided with horizontal pins 43 and 44 upon which is journaled respectively pulleys 45 and 46 arranged respectively relative to sheaves 35 and 36, and sheave 38.

A cable 47 is anchored at 48 and passes thence about sheaves 46 and 38 respectively, thence from sheaves 38 over sheaves 41 and 39 respectively, thence downwardly and forwardly about sheave 36 to and then upwardly about sheave 45 to and over sheave 35, thence rearwardly about sheave 33 to and then downwardly about sheave 31 to the winding drum of a power control unit 49 mounted on the rear of the tractor, which power control is of conventional design.

It will readily be understood that cable 47 may be pulled for swinging the implement upwardly about pivot 18, and may be slackened to allow the implement to swing downwardly.

It is also to be particularly noted that I have provided a control support frame constructed and mounted so as to maintain the axis of sheaves 35 and 38 parallel to the axis of sheaves 45 and 46 in any position of each of the wheeled frame structures 13 about their common horizontal axis, and consequently the shifting of the control cable as heretofor described in connection with my Patent No. 2,184,688 has been substantially eliminated.

It will be noted that cable 47 passes through hollow beam 26 between sheaves 31 and 33. This arrangement is utilized to protect the operator from injury due to a broken cable.

In Figure 1, the bulldozer is shown in a raised, though not the maximum, position indicated in broken lines at 50, in which position the bulldozer will be useful as a means for pushing over and bringing about the uprooting of trees and the like, and consequently it is to be especially noted that sheave blocks 35 and 38, together with the forward end of frame 21 upon which they are supported, are located some distance rearwardly of the front end of the tractor so that the bulldozer may be raised to the position indicated at 50, or even higher, without interfering with adjacent frame structure.

Having thus described my invention, what I claim as new and useful and desire to secure by Letters Patent is:

1. A material handling machine comprising, a tractor having a body and wheel supported frame structures extending along opposites sides of said body and journaled behind their front ends thereto for relative swinging movement about a common axis, an implement mounted on the tractor for vertical swinging movement about a horizontal axis, a control support frame extending across the tractor above the same and downwardly at opposite sides thereof, means pivotally supporting said control support frame directly on said implement at points removed from the pivotal connection of said implement with said tractor, other means connected with said tractor and with said control support frame for maintaining the latter in its upright position about its pivotal support on said implement, and control means between said implement and said control support frame for swinging said implement about said horizontal axis.

2. A material handling machine comprising, a tractor having a body and wheel supported frame structures extending along opposite sides of said body and journaled behind their front ends thereto for relative swinging movement about a common axis, an implement mounted on the tractor for vertical swinging movement about a horizontal axis, a rigidly constructed control support frame extending across the tractor above the same and downwardly at opposite sides thereof, means pivotally supporting said control support frame directly on said implement, other means connected with said tractor and with said control support frame for maintaining the latter in its upright position about its pivotal support on said implement, sheaves carried by said control support frame, sheaves carried by said implement, and a control cable reeved about said sheaves and applied to a cable winding drum carried by the tractor for swinging said implement about said horizontal axis.

3. A material handling machine comprising a tractor having a body and wheel supported frame structures extending along opposite sides thereof and journaled behind their front ends thereto for relative swinging movement about a common axis, an implement mounted on the tractor for vertical swinging movement about a horizontal axis, a single inverted U beam extending across the tractor above the same and downwardly at opposite sides thereof, means pivotally mounting said U beam directly on said implement, other means between said U frame and said tractor for maintaining said U frame in its upright position, sheaves carried by said U beam, sheaves carried by said implement, and a control cable reeved about said sheaves and applied to a cable winding drum carried by the tractor.

4. A material handling machine comprising, a tractor having a body and wheel supported frame structures extending along opposite sides thereof and journaled behind their front ends thereto for relative swinging movement about a common axis, an implement including side beams extending along opposite sides of the tractor and pivotally connected thereto for vertical swinging movement about a horizontal axis, a rigidly constructed control support frame extending across the tractor above the same and downwardly at opposite sides thereof, means pivotally mounting said control support frame on said implement side beams so as to support said control support frame parallel to the plane of said implement frame in any position of each of said wheeled frame structures about their common axis, other means connected with said tractor and with said control support frame for maintaining the latter in its upright position, sheave means carried by said control support frame directly above each of said wheeled frame structures, sheave means carried by said implement, and a control cable reeved about said sheave means, said tractor being provided with a cable winding drum to which said cable extends.

5. A material handling machine comprising, a tractor having a body and wheel supported frame structures extending along opposite sides thereof and journaled behind their front ends thereto for relative swinging movement about a common axis, an implement including side beams extending along opposite sides of the tractor and pivotally supported on said wheeled frame structures for swinging movement about a horizontal axis, a single inverted U beam extending across the tractor above the same and downwardly at opposite sides thereof, means pivotally supporting said U beam on said implement side beams at points spaced from the pivotal connection of said side beams with said wheeled frame structures, other means between said U beam and the tractor for maintaining said U beam in its upright position, sheaves carried by said U beam, sheaves carried by said implement, and a control cable reeved about said sheave means, said tractor being provided with a cable winding drum to which said cable is applied.

6. A material handling machine comprising a tractor having a body and wheel supported frame structures extending along opposite sides thereof and journaled behind their front ends thereto for relative swinging movement about a common axis, an implement including side beams extending along opposite sides of the tractor and pivotally supported on said wheeled frame structures for swinging movement about a horizontal axis, a single inverted U beam extending across the tractor above the same and downwardly at opposite sides thereof, means pivotally supporting said U beam on said implement side beams at points spaced from the pivotal connections of said side beams with said wheeled structures, an overhead beam structure rigid with said U beam and overhanging the tractor at its rear end, means between said overhead beam structure and said body of the tractor for maintaining said U beam in its upright position, sheave means carried by said overhead beam structure, sheaves means carried by said U beam, sheave means carried by said implement, and a cable reeved about the sheaves on said implement and said U beam and passing over the sheaves on said overhead beam structure to a cable winding drum carried by the tractor.

7. A material handling machine comprising, a tractor having a body and wheel supported frame structures extending along opposite sides of said body and journaled behind their front ends thereto for relative swinging movement about a common axis, an implement including side beams extending along opposite sides of the tractor and pivotally supported adjacent their rear ends on said wheeled frame structures for vertical swinging movement about a horizontal axis, a rigidly constructed control support frame extending across the tractor above the same and downwardly at opposite sides thereof, means pivotally supporting said control support frame on said implement side beams at points spaced from the pivotal connection of said side beams with said wheeled frame structures, other means connected with said tractor and with said control support frame for maintaining the latter in its upright position, sheave means carried by said control support frame directly above each of said wheeled frame structures, sheave means carried by said implement adjacent the forward end of each of said wheeled frame structures, and a control cable reeved about said sheave means, said tractor being provided with a cable winding drum to which said cable extends.

8. A material handling machine comprising a vehicle, an implement mounted on said vehicle for vertical swinging movement about a horizontal axis, a control support frame extending across said vehicle above the same and downwardly at opposite sides thereof, means pivotally supporting said control support frame on said implement at points removed from the pivotal connection of said implement with said vehicle, other means applied to said control support frame to maintain the same in its upright position about its pivotal support on said implement, and control means between said implement and said control support frame for swinging said implement about said horizontal axis.

9. A material handling machine comprising, a vehicle having a body and wheel supported frame structures extending along opposite sides thereof and journaled thereto for relative swinging movement, an implement mounted on said vehicle for vertical swinging movement about a horizontal axis, a control support frame extending across said vehicle above the same and downwardly at opposite sides thereof, means pivotally mounting said control support frame on said implement so as to support the same parallel to the plane of said implement in any position of each of said wheeled frame structures about their pivotal mounting, other means applied to said control support frame to maintain the same in its upright position about its pivotal support on said implement, and control means between said implement and said control support frame for swinging said implement about said horizontal axis.

CHARLES LE BLEU.